United States Patent
Speks (10) Patent No.: US 8,929,892 B2
(45) Date of Patent: Jan. 6, 2015

(54) LOCATION BASED NETWORK SELECTION

(75) Inventor: Oliver Speks, Eschweiler (DE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1 day.

(21) Appl. No.: 13/996,260

(22) PCT Filed: Dec. 23, 2010

(86) PCT No.: PCT/EP2010/070665
§ 371 (c)(1),
(2), (4) Date: Jun. 20, 2013

(87) PCT Pub. No.: WO2012/084053
PCT Pub. Date: Jun. 28, 2012

(65) Prior Publication Data
US 2013/0273914 A1    Oct. 17, 2013

(51) Int. Cl.
*H04W 4/00*    (2009.01)
*H04W 36/32*   (2009.01)
*H04W 48/18*   (2009.01)
*H04W 48/04*   (2009.01)

(52) U.S. Cl.
CPC .............. *H04W 36/32* (2013.01); *H04W 48/18* (2013.01); *H04W 48/04* (2013.01)
USPC ................... 455/435.1; 455/418; 455/456.6; 455/456.1

(58) Field of Classification Search
CPC ...... H04W 60/00; H04W 8/245; H04W 64/00
USPC .......................... 455/435.1, 418, 456.6, 456.1
See application file for complete search history.

(56) References Cited

U.S. PATENT DOCUMENTS

| | | | |
|---|---|---|---|
| 6,085,110 A * | 7/2000 | Nilsson | 455/552.1 |
| 7,171,216 B1 | 1/2007 | Choksi | |
| 8,441,983 B2 * | 5/2013 | Calhoun et al. | 370/328 |

(Continued)

FOREIGN PATENT DOCUMENTS

| | | |
|---|---|---|
| GB | 2395867 A | 6/2004 |
| GB | 2470194 A | 11/2010 |

OTHER PUBLICATIONS

International Search Report, PCT/EP2010/090665, Nov. 9, 2011.

(Continued)

*Primary Examiner* — Danh Le
(74) *Attorney, Agent, or Firm* — Myers Bigel Sibley & Sajovec, P.A.

(57) ABSTRACT

The present invention relates to location based network selection in a mobile terminal moving (A to H) in a wireless communication environment set up of a home network in a home country having a border and at least one foreign network achieving radio coverage at least in part of the geographical area of the home country. A position (A to H) of the mobile terminal is monitored. Then, a network selection mode is automatically switched from a home network selection mode, enabling registration only to the home network, to an automatic network selection mode when the mobile terminal crosses the border from the home country to the foreign country. The network selection mode is switched back to the home network selection mode when the mobile terminal is again located in the home country. Thus, as long as the mobile terminal is located in the home country, it does never select any other network than the home network. When located abroad, automatic network selection applies.

13 Claims, 4 Drawing Sheets

(56) References Cited

U.S. PATENT DOCUMENTS

| | | | |
|---|---|---|---|
| 2005/0107109 A1 | 5/2005 | Gunaratnam et al. | |
| 2006/0010250 A1* | 1/2006 | Eisl et al. | 709/245 |
| 2006/0105778 A1 | 5/2006 | Wiederspahn | |
| 2008/0293411 A1* | 11/2008 | Hinton et al. | 455/435.1 |
| 2009/0011697 A1* | 1/2009 | Tobita et al. | 455/3.01 |
| 2012/0282924 A1* | 11/2012 | Tagg et al. | 455/432.1 |

OTHER PUBLICATIONS

Written Opinion of the International Searching Authority, PCT/EP2010/090665, Nov. 9, 2011.

3GPP, Technical Specification "3$^{rd}$ Generation Partnership Project; Technical Specification Group Services and System Aspects; Service accessibility (Release 9)", 3GPP TS 22.011 V9.1.0 (Mar. 2009), 23 pp.

3GPP, Technical Specification "3$^{rd}$ Generation Partnership Project; Technical Specification Group Radio Access Network; User Equipment (UE) procedures in idle mode and procedures for cell reselection in connected mode (Release 8)", 3GPP TS 25.304 V8.6.0 (Jun. 2009), 49 pp.

3GPP, Technical Specification "3$^{rd}$ Generation Partnership Project; Technical Specification Group Core Network and Terminals; Non-Access-Stratum (NAS) functions related to Mobile Station (MS) in idle mode (Release 9)", 3GPP TS 23.122 V9.0.0 (Sep. 2009), 40 pp.

* cited by examiner

LOCATION BASED NETWORK SELECTION

CROSS REFERENCE TO RELATED APPLICATION

This application is a 35 U.S.C. §371 national stage application of PCT International Application No. PCT/EP2010/070665, filed on 23 Dec. 2010, the disclosure and content of which is incorporated by reference herein in its entirety. The above-referenced PCT International Application was published in the English language as International Publication No. WO 2012/084053 A1 on 28 Jun. 2012.

FIELD OF INVENTION

The present invention relates to a method of location based network selection in a wireless communication system, a related mobile terminal, and a related computer program product.

BACKGROUND ART

Radio access coverage provided by cellular mobile networks is usually limited to political boundaries. Along these boundaries the coverage areas overlap. Due to physical irregularities it may happen that at certain areas, coverage is only provided by the network that is operated from the other side of the border.

According to 3GPP standard 3GPP TS 22.011 V9.1.0 (2009-03) $3^{rd}$ Generation Partnership Project, Technical Specification Group Services and System Aspects, Service accessibility (Release 9), the network selection decision is taken by a user terminal. The user can choose between two standardized network selection methods: manual or automatic network selection. The network selection decision in automatic mode is influenced by results of measurements performed by the user terminal, by various operator provided and user provided network lists indicating preference, equivalence and exclusion and by the capabilities of the mobile terminal. The decision for network selection is taken at the following trigger points, when the mobile terminal is working in automatic network selection mode:

At switch-on or recovery from lack of coverage: according to one option described in TS 22.011 V9.1.0 (2009-03) $3^{rd}$ Generation Partnership Project, clause 3.2.2.2, the mobile terminal in automatic network selection mode registers itself to the home network, if available.

Periodic network selection interval ends: the interval is a service provider determined value, which is stored on the SIM/USIM. It can range between 6 minutes and 8 hours, with a default of 60 minutes.

If the mobile terminal loses coverage of the registered home network: according to 3GPP TS 25.304 V8.6.0 (2009-06) $3^{rd}$ Generation Partnership Project, Technical Specification Group Radio Access Network, then the user terminal procedures in idle mode and procedures for cell reselection in connected mode (Release 9), a new network is selected if the mobile terminal is working in automatic network selection mode. Otherwise, the user is prompted to select a different network.

Further, as long as cells are available that belong to the PLMN that the mobile terminal is currently registered on, no automatic network re-selection is performed. In other words, the mobile terminal will remain registered in the same network as long as possible, except if a network with higher priority has been found at periodic network selection.

With respect to the registration to different networks and related signaling the move of the mobile terminal in idle mode from one radio cell to a neighboring radio cell within the same registration area does not cause any network load and does not cause any problems concerning paging. Registration to a different network requires location registration. Repeated change between registration areas would cause heavy signaling load and increase the risk of a paging message being lost. It is therefore required by 3GPP TS 23.122 V9.0.0 (2009-09) $3^{rd}$ Generation Partnership Project, Technical Specification Group Core Network and Terminals, Non-Access-Stratum (NAS) functions related to Mobile Station (MS) in idle mode (Release 9), clause 3.3, that the access stratum shall provide a mechanism to limit this effect.

Therefore, it would not be acceptable to implement a mechanism that registers the mobile terminal to the home network HPLMN whenever the home network HPLMN is available. Any proposed solution must be comparable to existing solutions as far as signaling load and location registration frequency is concerned.

Further, in IN 20050195514, Method for GPS based network selection during service origination in multi-rate environment Samsung Electronics Co Ltd. (SMSU), there is proposed a method to select radio access type dependent on GPS determined location of the mobile terminal. The solution requires support by the network and the network decides which RAT shall be used.

Further, in GB 2 395 867, Modifying List of Preferred Networks Stored in SIM in Response to Location Information Orange S.A., France, the list of preferred PLMNs is modified within the mobile terminal based on location information. This allows for additional flexibility concerning network selection preferences, but it does prevent the mobile terminal to register itself to a foreign network while being located in the home country and radio contact to the home network is lost. Neither will it initiate registration back to the home network when radio signal conditions would allow it.

Further, in US 2005/0107109 A1, Network Selection Methods and Apparatus with Home Network Prioritization after Network Signal Recovery or Power-On, John J. Oskorep, preference is given to the home network when contact to the foreign network is lost. It is not prevented that the mobile terminals remains registered to a foreign network when moving within the home country.

Further, in U.S. Pat. No. 7,171,216 B1, Method and System for Detecting a Preferred Wireless Network for a Mobile Device Cisco Technology, Inc., scanning for a micro network is limited to scenarios where the mobile terminal is within the geographical proximity of the micro network. When the preferred network is available, the mobile terminal camps to the preferred network.

However, with the automatic network selection mode users configuring their mobile terminal to perform automatic network selection may experience the following problem when roaming in a region where public land mobile networks PLMN of adjacent countries overlap. When moving within the home country, the mobile terminal may get registered to the foreign network and will remain so until periodic network reselection takes place and the home network is available at that time or until manual intervention by the user.

This behavior is unexpected and unwanted by most users. It may happen unnoticed by the user but can have significant impact on the charging of originating and terminating calls.

With automatic network selection, registration to the foreign network will always happen if radio contact to the home network is lost. Dependent on geographical irregularities it may happen that certain areas are covered by a foreign network but not by the home network.

A common workaround is to choose manual network selection mode when moving within the home country. Users configuring their mobile terminal to work in manual network selection mode will not experience the problems described above when roaming moving the home country.

However, they have to remember to manually select a new network whenever they cross a country border and loose coverage of the network the mobile terminal is registered in. When the user forgets to select the home network upon entering the home country, again the risk exists to originate or terminate calls at different cost than expected.

Further, not selecting a new network when loosing coverage of the current network leads to un-reachability for extended periods of time. For international travelers, manual network selection mode is therefore not the preferred choice, but only for users that usually remain within the home country.

SUMMARY OF INVENTION

In view of the above the object of the present invention is to prevent the mobile terminal from being registered to foreign networks while moving in the home country with radio coverage through the home network.

According to a first aspect of the present invention there is provided a method of location based network selection in a mobile terminal moving in a wireless communication environment set up of a home network in a home country having a border and at least one foreign network achieving radio coverage at least in part of the geographical area of the home country. The method comprises the steps of monitoring a position of the mobile terminal in terms of geographical coordinates and automatically switching a network selection mode from a home network selection mode to an automatic network selection mode when the mobile terminal crosses the border from the home country to the foreign country and switching back to the home network selection mode when entering again the home country.

According to second aspect of the present invention there is provided a mobile terminal for location based network selection when moving in a wireless communication environment set up of a home network in a home country having a border and at least one foreign network achieving radio coverage at least in part of the geographical area of the home country. The mobile terminal comprises a position monitoring unit adapted to monitor a position of the mobile terminal in terms of geographical coordinates and a network selection mode control unit adapted to automatically switch a network selection mode from a home network selection mode to an automatic network selection mode when the mobile terminal crosses the border from the home country to the foreign country and switching back to the home network selection mode when entering again the home country.

According to a third aspect of the present invention there is provided a computer program product directly loadable into the internal memory of the mobile terminal, comprising software code portions for performing the steps of the location based network selection according to the present invention when the product is run on a processor of the mobile terminal.

BRIEF DESCRIPTION OF DRAWING

In the following the present invention will be described in more detail through reference to the enclosed drawing in which.

DETAILED DESCRIPTION

In the following the present invention will be described in more detail through reference to the enclosed drawing. Here it should be understood that as far as different functionalities or functional part are described with respect to the present invention these may be implemented in hardware, in software, and/or a combination thereof.

Generally the present invention relates to location based network selection at a mobile terminal moving in a wireless communication environment set up of a home network in a home country having a border and at least one foreign network achieving radio coverage at least in part of the geographical area of the home country. A first alternative would be that the foreign network achieves coverage in the home country in an area where the home network does not achieve radio coverage. A second alternative would be that the radio coverage of the foreign network and the home network overlap at the border between the home country and the foreign country.

The present invention combines the advantages of using of manual network selection within the home country and automatic network selection while being abroad in a foreign country, without the need to change network selection modes before and after an international travel. According to the present invention home network selection mode means that in the home country only a registration to the home network is allowed.

Figure 1:
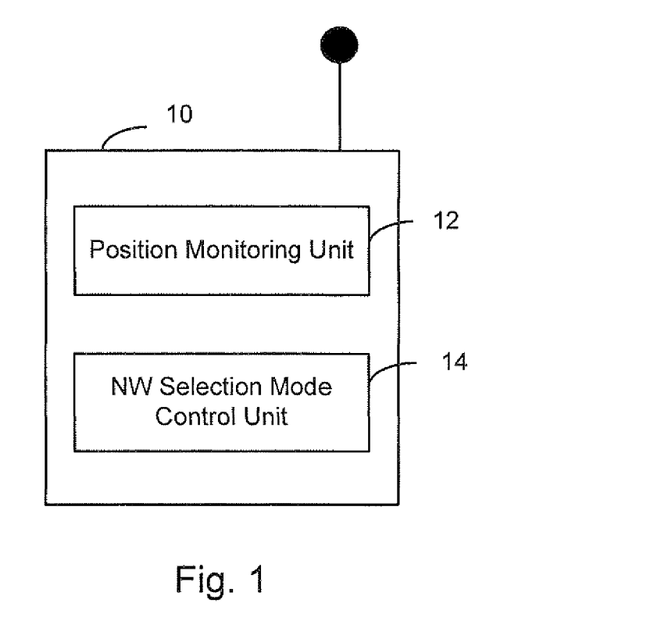
FIG. 1 shows a schematic diagram of a mobile terminal according to the present invention.

FIG. 1 shows a schematic diagram of a mobile terminal according to the present invention.

As shown in FIG. 1 a mobile terminal 10 according to the present invention comprises a position monitoring unit 12 and a network selection mode control unit 14.

Figure 2:
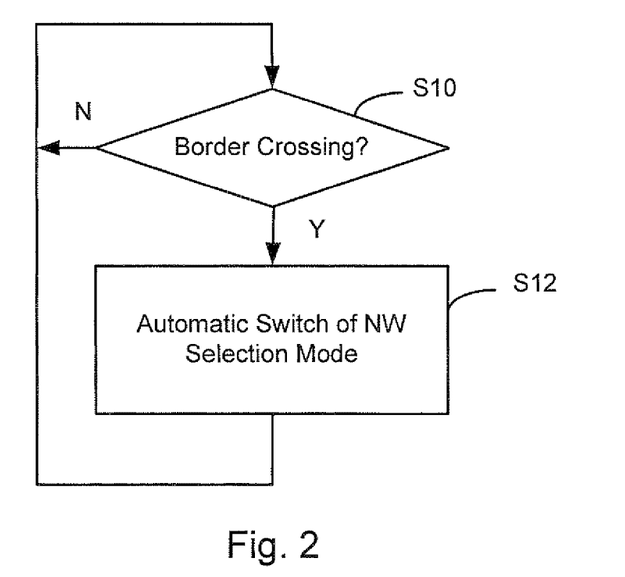
FIG. 2 shows a flowchart of operation for the mobile terminal shown in FIG. 2.

FIG. 2 shows a flowchart of operation for the mobile terminal shown in FIG. 2.

As shown in FIG. 2, in a step S10, operatively executed by the positioning monitoring unit 12 shown in FIG. 1, a position of the mobile terminal 10 is monitored in terms of geographical coordinates. Preferably, the monitoring of the position if the mobile terminal is executed repeatedly and continuously, further preferably periodically. Further, the position of the mobile terminal 10 may be monitored through a network based positioning method or a mobile terminal based positioning mechanism.

Generally, positioning systems applicable within the framework set up by the present invention may, e.g., determine the distance from known positions of several senders of a radio signal by means of measuring the signal delay of each signal. The delay is proportional to the distance between sender and receiver. The sender can be terrestrial, e.g., a base station or the mobile terminal or orbital, i.e. a satellite. In theory, the exact position determination requires reception of three signals from different directions, but in practice a higher number of signals may be evaluated to achieve higher accuracy and compensate for various disturbances.

Here, network based positioning mechanisms let the network determine the position of the mobile terminal and provide the coordinates to the mobile terminal. Mobile terminal based positioning mechanisms require the mobile terminal to perform measurement of signal delays.

Further, evaluation algorithms compensate for signal disturbances and to improve the positioning quality. Even if only one radio signal can be received, the information may be good enough for the purpose of the present invention, if the information is sufficient to determine if the mobile terminal is inside or outside, e.g., the political boundaries of the home country. Cellular radio signals carry identifications that allow identifying the position of the sender. The footprint of the sender may be known and this information can be made available to the mobile terminal. Only if signals from cells that have footprints in border regions are received, a more accurate positioning determination is required, otherwise the mobile terminal is positioned in the same country as the sender.

Further, mobile terminal based solutions typically calculate the position using satellite positioning services, e.g., GPS.

Overall, the outcome of the monitoring step S10 shown in FIG. 2 is a determination whether the mobile terminal crosses a border of its home country, either from the home country to at least one foreign country or from a foreign country to the home country.

As shown in FIG. 2, in a step S12, operatively executed by the network selection mode control unit 14 shown in FIG. 1, a network selection mode is switched from a home network selection mode to an automatic network selection mode when the mobile terminal crosses the border from the home country to the foreign country and vice versa. Preferably, in the step S12 the switching from the home network selection mode to the automatic network selection mode or vice versa is executed automatically.

In view of the above, the present invention originates from the understanding of the strengths and weaknesses of manual and automatic network selection modes:

| | MANUAL NETWORK SELECTION | AUTOMATIC NETWORK SELECTION | LOCATION BASED NETWORK SELECTION |
|---|---|---|---|
| No unexpected registering to foreign network when roaming in home network | ✓ | | ✓ |
| No un-reachability for international travellers | | ✓ | ✓ |
| Not being registered to foreign network when returning home but forgetting manual selection | | ✓ | ✓ |
| Best possible reachability within home country | | | ✓ |

When moving in border regions within the home country, many users choose the manual network selection mode. When travelling abroad, the automatic network selection mode is more convenient.

In view of this, according to the present invention the mobile terminal 10 is made aware of the fact if it is located within the borders of the home country or abroad. Therefore, the mobile terminal 10 may adapt the network selection method accordingly. As long as the mobile terminal 10 is located within the borders of the home country, it does never select any other network than the home network. When located abroad, automatic network selection applies. Entering the home country again serves as an additional trigger to perform network re-selection with the aim to register to the home network as soon as possible, i.e. when being available.

Figure 3:
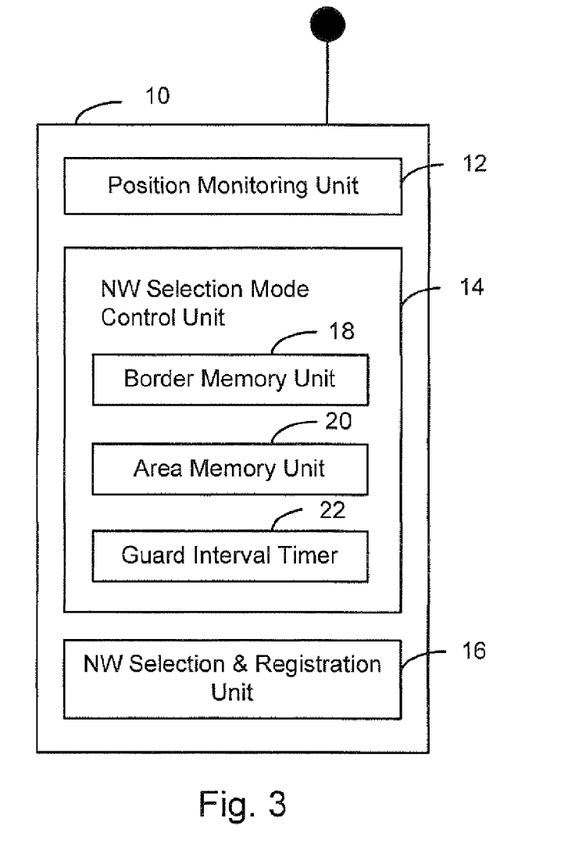
FIG. 3 shows a further detailed schematic diagram of the mobile terminal shown in FIG. 1.

FIG. 3 shows a further detailed schematic diagram of the mobile terminal shown in FIG. 1.

As shown in FIG. 3, further to the positioning monitoring unit 12 and the network selection mode control unit 14 shown in FIG. 1, the mobile terminal further comprises a network selection and registration unit 16. As also shown in FIG. 3, the network selection mode control unit 14 comprises a border memory unit 18, a mode selection area memory unit 20, and a guard interval timer 22.

In the following the operation of the mobile terminal shown in FIG. 3 will be explained with respect to FIG. 4 and FIG. 5.

Figure 4:
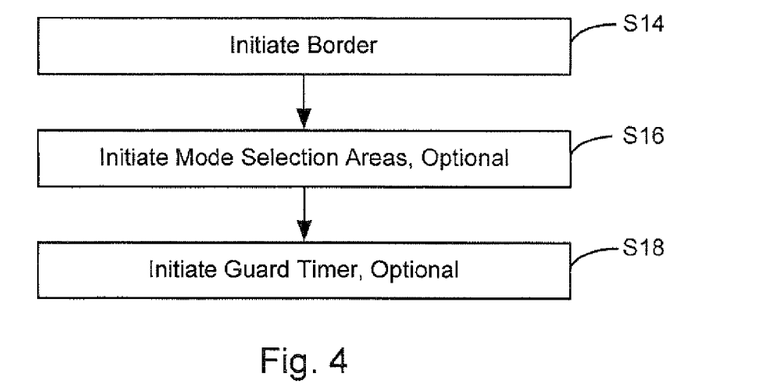
FIG. 4 shows a flowchart of preparing operation of the mobile terminal shown in FIG. 4.
Figure 5:
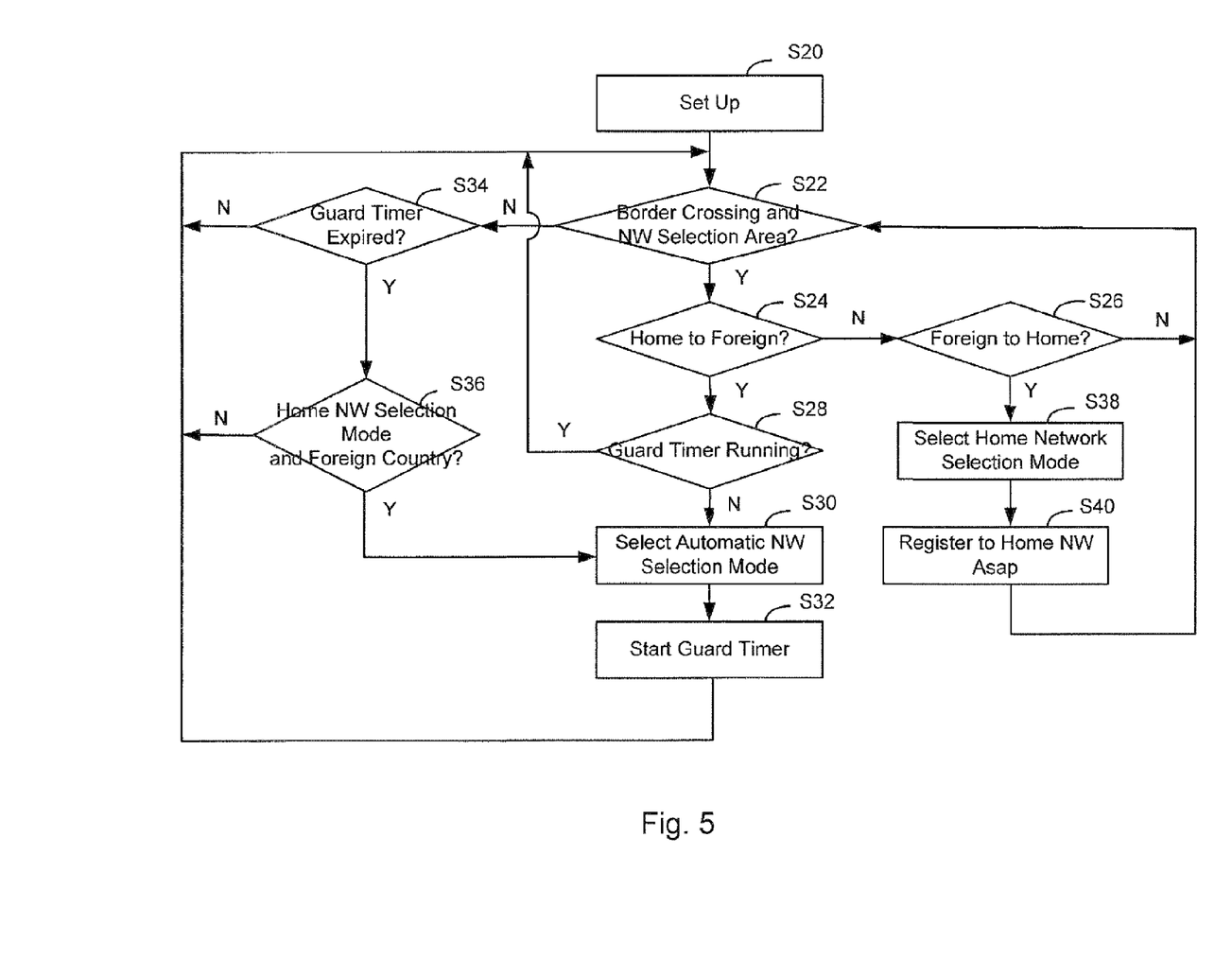
FIG. 5 shows a flowchart of executing location based network selection and registration for the mobile terminal shown in FIG. 4.

Here, FIG. 4 shows a flowchart of preparing the location based network selection according to the present invention and FIG. 5 shows a flowchart of executing location based network selection and registration according to the present invention.

As shown in FIG. 4, in a step S14, operatively executed by the border memory unit 18 shown in FIG. 3, there is stored a list of border coordinates in the mobile terminal 10 for identifying the border of the home country. Here, the list of border coordinates for identifying the border may be provided by and downloaded from the home network or may be pre-stored in the border memory unit 18 of the mobile terminal 10.

In view of this, the mobile terminal 10 has knowledge about the boundaries of the home country. Since the political boundaries do normally not change and for the ease of rollout of the proposed functionality, a mobile terminal based solution may be preferable. The list of coordinates is installed to the border memory unit 14 of the mobile terminal as part of the branding process or it can be provided for download by the user at a later point in time.

As shown in FIG. 4, in a step S16, operatively executed by the area memory unit 20 shown in FIG. 3, there is provided and stored a list of regional areas to the mobile terminal 10 where the location based network selection applies.

As shown in FIG. 4, in a step 818, operatively executed by the guard interval timer 22 shown in FIG. 3, there is initiated a guard time interval when the mobile terminal 10 crosses the border from the home country to the foreign country to delay registration to a foreign network according to a predetermined guard time interval. Preferably, the guard interval timer 22 increases the guard time interval each time the mobile terminal crosses a border from the home country to the same foreign country and decreases the guard time interval when no border is crossed for a certain time.

The preparatory steps S14 to S18 explained above with respect to FIG. 4 serve as basis for a location based network selection according to the present invention as explained in the following with respect to FIG. 5.

As shown in FIG. 5, in a step S20, operatively executed by the network selection mode control unit 14 shown in FIG. 3, all preparatory steps S14 and optionally S16 and S18 are executed for set up and preparation of the location based network selection according to the present invention.

As shown in FIG. 5, in a step S22, operatively executed by the position monitoring unit 12 shown in FIGS. 1 and 3, it is determined whether the mobile terminal is in a state of crossing a border between the home country and the foreign country.

As shown in FIG. 5, the interrogation step S22 may be supplemented by an optional interrogation whether the mobile terminal is located in an area either of the home country or the foreign country to which location based network selection according to the present invention applies.

The logic behind this is that for the purpose of power saving the positioning mechanism may be activated only for location areas that are close to the border. The data that is provisioned to the mobile terminal 10 must in this case be extended by a list of location areas where positioning shall apply as stored in the area memory unit 20 shown in FIG. 3.

As shown in FIG. 5, assuming that the interrogation in step S22 is affirmative, in a step S24, operatively executed by the position monitoring unit 12 shown in FIG. 3, it is interrogated whether the border is crossed from the home country to the foreign country in a step S24 or from the foreign country to the home country in a step S26. Here, the latter step S26 may be considered as optional assuming that the border is either crossed form the home country to the foreign country or vice versa.

As shown in FIG. 5, assuming that the interrogation in step S24 is affirmative, in a step S28, operatively executed by the guard interval timer 22 shown in FIG. 3, it is interrogated whether the guard interval timer 22 is running.

If so, the process braches back to step the S22 to delay the activation of the automatic network selection mode. The reason for the provision of the guard interval timer 22 is that due to limited accuracy of the positioning solution or a movement along the border under certain conditions it may happen that the mobile terminal 10 considers itself to be repeatedly moving between the home country and the foreign country. This leads to frequent location registration if loss and regaining of coverage of the home network occurs in this process. Here, the guard interval timer 22 may be used to overcome this problem without violating the principle that the mobile terminal 10 is registered to the home network while located in the home country. Registration to the foreign network is delayed by a certain time.

Preferably, the guard time interval is increased each time the same border is crossed and decreased when that border is not crossed for a certain while, according to the so-called leaky bucket principle.

As shown in FIG. 5, when it is determined in the step S28 that the guard interval timer is not running then follows a step S30, operatively executed by the network selection mode control unit 14 shown in FIGS. 1 and 3, so as to switch to the automatic network selection mode.

A shown in FIG. 5, subsequent to step S30 there follows a step 32, operatively being executed by the guard interval timer 22 shown in FIG. 3, so as to start the guard interval timer 22. This start of the guard timer introduces a hysteresis to network mode selection for subsequent crossings of the border between the home network and the foreign network.

As shown in FIG. 5, the control of the network selection mode also relies on a step S34, operatively executed by the guard interval timer 22 shown in FIG. 3, and a step S36, operatively executed by the position monitoring unit 22. Here, the guard interval timer 22 will continue to run and finally expire. If at expiry of the guard interval timer 22 the mobile terminal 10 is located in the home country the process flow goes back to step S22, otherwise when the mobile terminal 10 is operating in the home network selection mode and located in the foreign country the automatic network selection mode will be set in the step S30.

While above, the principle of location based network selection in the foreign network has been described with respect to the left part of FIG. 5 in the following principles underlying the location based network selection in the home network will be explained with respect to the right part of FIG. 5.

As shown in FIG. 5, in a step S38, operatively executed by the network selection mode control unit 14, there is executed an automatic switching from an automatic network selection mode as used in the foreign network to the home network selection mode as used in the home network.

A registration to any foreign network that might have occasionally been identified in the home country is blocked as long as the mobile terminal 10 is positioned inside the border of the home country.

As shown in FIG. 5, in a step S40, operatively executed by the network selection and registration unit 16 shown in FIG. 3, there is executed a registration to the home network.

Therefore, according to the present invention the network selection algorithm within the mobile terminal is modified to use the geographical coordinates as additional input. If the current position is within the home country then location registration is only allowed to the home network. Upon entering the coverage are of the home country and when the mobile terminal 10 is registered to a foreign network, then the mobile terminal 10 shall register itself to the home network as soon as possible.

Here, typical examples for as soon as possible are the fulfilments of criteria, e.g., that a signal strength with respect to a home network considered for registration exceeds a certain pre-determined threshold, that a pre-determined radio access technology, e.g., GSM, UMTS, LTE, etc. becomes available, etc.

Figure 6:
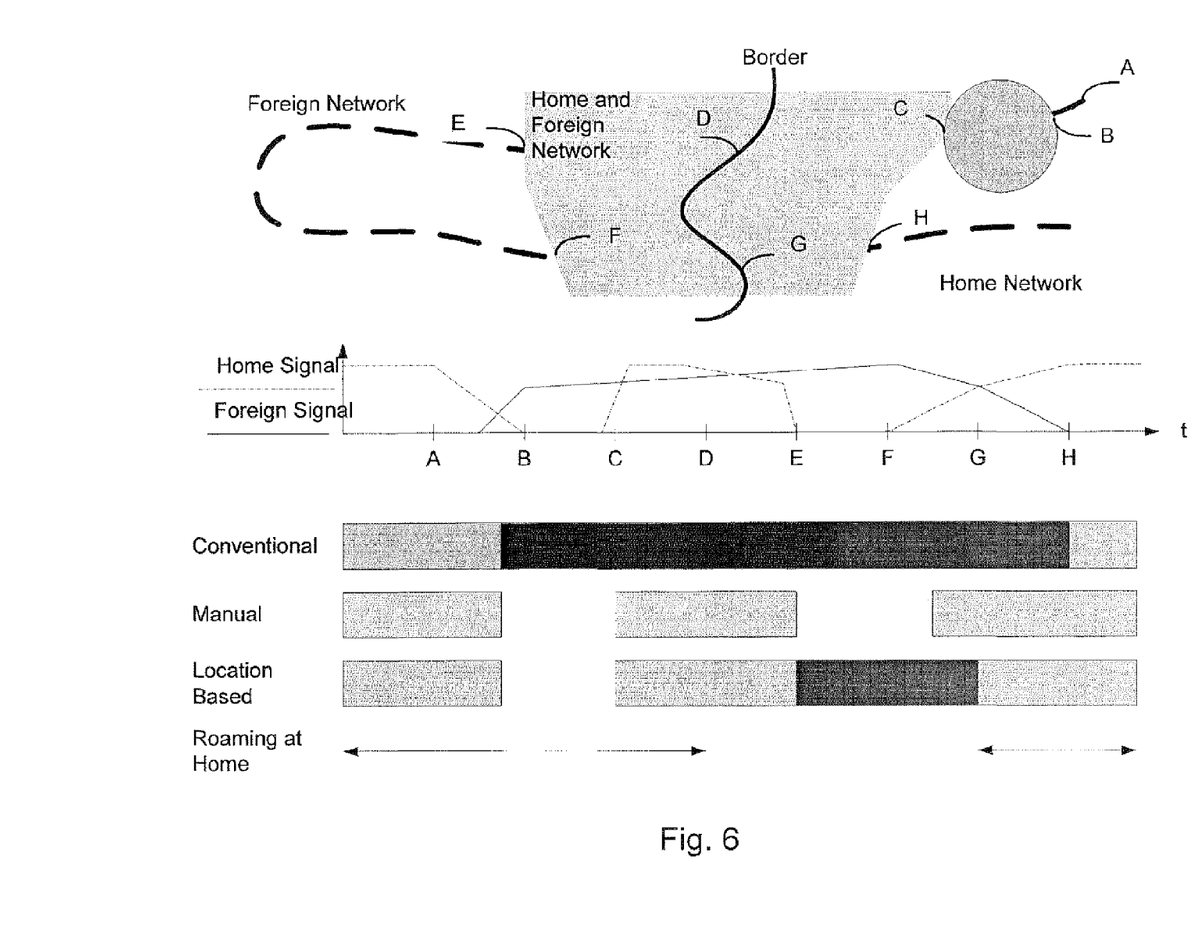
FIG. 6 shows an example of operation for the mobile terminal shown in FIG. 4.

FIG. 6 shows an example of operation for location based network selection in the mobile terminal as explained above.

As shown in FIG. 6, the illustrated application scenario relates to a movement of the mobile terminal 10 along the points A to H. The area right to the border is covered by the home network and the area left to the border is covered by the foreign network. Further, for the purpose of illustration the dark shaded circular region in the home network is considered as area with reduced reception quality and the shaded region in the border region is a region having double network coverage through the home network and the foreign network.

As shown in FIG. 6, depending on the position of the mobile terminal the signal strength of the received radio signal in the home network and the foreign network will vary and continuously increase or decrease, respectively.

As shown in FIG. 6, in an overlap region and close to the border generally there is an overlap in availability of service delivery from the home network and the foreign network, e.g., see section C to E or F to H.

As shown in FIG. 6, assuming a conventional automatic network selection mechanism then upon entry into the radio shade area from B to C the mobile terminal 10 would switch to the foreign network assuming that it would be receivable as of the position B. Then in an attempt to reduce network switching to a maximum, the mobile terminal would remain registered to the foreign network as long as possible, e.g., up to the position H. Only then would the mobile terminal 10 switch back to the home network. As outlined above, this may have a significant undesired impact on the charges for the user.

As shown in FIG. 6, the outcome would be fully different assuming that the network selection is purely manual. In particular it may be avoided that the mobile terminal is registered to the foreign network in its home territory, however, at the extra burden that the user of the mobile terminal must continuously check on the correct registration in relation to a current positioning.

As shown in FIG. 6, all problems being associated with the conventional or manual network selection may be avoided with the location based network selection according to the present invention. The reason for this are the automatic switching of the network selection mode upon crossing of the border and the registration with the home network in an as soon as possible manner while being at home. As shown in the lower part of FIG. 6, this leads to a maximised maintenance of home network registration while at the same time guaranteeing network coverage also in the foreign network. In other words, in the home network similar results as with manual registration are achieved while maintaining the advantages of the conventional automatic network selection in the foreign network.

Further to the above it should be mentioned that according to the present invention there is also provided a computer program product directly loadable into the internal memory of a mobile terminal comprising software code portions for performing the inventive network selection process when the product is run on a processor of the mobile terminal.

Therefore, the present invention is also provided to achieve an implementation of the inventive method steps on computer or processor systems. In conclusion, such implementation leads to the provision of computer program products for use with a computer system or more specifically a processor comprised in e.g., a mobile terminal.

These programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and harddrives; or information conveyed to a computer/processor through communication media such as network and/or telephone networks via modems or other interface devices. It should be understood that such media, when carrying processor readable instructions implementing the inventive concept represent alternate embodiments of the present invention.

While in the above, the present invention has been described with reference to the drawings and figures of preferred embodiments of the invention, it should be noted that clearly the present invention may also be implemented using variations and modifications thereof which will be apparent and can be readily made by those skilled in the art without departing from the scope and spirit of the present invention defined by the following claims. E.g., functionalities described above may be realized in software, in hardware, or a combination thereof.

Accordingly, it is not intended that the scope of claims appended hereto is limited to the description as set forth herein, but rather that the claims should be construed so as to encompass all features of presentable novelty that preside in the present invention, including all features that would be treated as equivalent thereof by those skilled in the art to which the present invention pertains.

The invention claimed is:

1. Method of location based network selection in a mobile terminal moving in a wireless communication environment set up of a home network in a home country having a border and at least one foreign network achieving radio coverage at least in part of the geographical area of the home country, the method comprising the steps:
   monitoring a position of the mobile terminal in terms of geographical coordinates;
   automatically switching a network selection mode from a home network selection mode to an automatic network selection mode in response to when the mobile terminal crosses the border from the home country to the foreign country and switching back to the home network selection mode in response to when the mobile terminal crosses the border from the foreign country to the home country; and
   initiating a guard timer in response to when the mobile terminal crosses the border from the home country to the foreign country and using the guard timer to control the automatic switching to delay repeated registration to a foreign network according to a predetermined guard time interval.

2. The method according to claim 1, wherein the position of the mobile terminal is monitored through a network based positioning method or a mobile terminal based positioning mechanism.

3. The method according to claim 1, further comprising the step of blocking a registration of the mobile terminal to a foreign network and cause registering of the mobile terminal only to the home network in response to when the mobile terminal is positioned in the home country.

4. The method according to claim 3, further comprising the step of registering the mobile terminal with the home network as soon as operationally possible in response to when the mobile terminal crosses the border from the foreign country to the home country.

5. The method according to claim 1, further comprising the step of providing to the mobile terminal for storage a list of regional areas where the location based network selection applies,
   wherein the switching comprises comparing the position of the mobile terminal to the list of regional areas stored within the mobile terminal to determine when the mobile terminal crosses the border from the home country to the foreign country and vice versa.

6. A computer program product directly loadable into an internal memory of the mobile terminal, comprising software code portions for performing the steps of claim 1, when the product is run on a processor of the mobile terminal.

7. Method of location based network selection in a mobile terminal moving in a wireless communication environment set up of a home network in a home country having a border and at least one foreign network achieving radio coverage at least in part of the geographical area of the home country, the method comprising the steps:
   monitoring a position of the mobile terminal in terms of geographical coordinates;
   automatically switching a network selection mode from a home network selection mode to an automatic network selection mode in response to when the mobile terminal crosses the border from the home country to the foreign country and switching back to the home network selection mode in response to when the mobile terminal crosses the border from the foreign country to the home country; and
   providing to the mobile terminal for storage a list of border coordinates identifying the border of the home country for use in the automatic switching, wherein the automatic switching comprises comparing the position of the mobile terminal to the list of border coordinates stored within the mobile terminal to determine when the mobile terminal crosses the border from the home country to the foreign country and vice versa.

8. Mobile terminal for location based network selection when moving in a wireless communication environment set up of home network in a home country having a border and at least one foreign network achieving radio coverage at least in part of the geographical area of the home country, the mobile terminal comprising:
 a position monitoring unit adapted to monitor a position of the mobile terminal in terms of geographical coordinates;
 a network selection mode control unit adapted to automatically switch a network selection mode from a home network selection mode to an automatic network selection mode in response to when the mobile terminal crosses the border from the home country to the foreign country and switching back to the home network selection mode in response to when the mobile terminal crosses the border from the foreign country to the home country; and
 a guard interval timer adapted to track a guard time interval from when the mobile terminal crosses the border from the home country to the foreign country,
 wherein the network selection mode control unit uses the guard time interval to control the automatic switching to delay repeated registration to the foreign network.

9. The mobile terminal according to claim 8, wherein the position monitoring unit is adapted to monitor the position of the mobile terminal through a network based positioning method or a mobile terminal based positioning mechanism.

10. The mobile terminal according to claim 8, further comprising a network selection and registration unit adapted to block a registration of the mobile terminal to a foreign network and to register the mobile terminal only to the home network in response to when the mobile terminal is positioned in the home country.

11. The mobile terminal according to claim 10, wherein the network selection and registration unit is adapted to register the mobile terminal with the home network as soon as operationally possible in response to when the mobile terminal crosses the border from the foreign country to the home country.

12. The mobile terminal to claim 8, further comprising a location area memory unit adapted to store a list of regional areas to the mobile terminal where the location based network selection applies,
 wherein the network selection mode control unit controls the automatic switching based on comparison of the position of the mobile terminal to the list of border coordinates stored within the mobile terminal to determine when the mobile terminal crosses the border from the home country to the foreign country and vice versa.

13. Mobile terminal for location based network selection when moving in a wireless communication environment set up of home network in a home country having a border and at least one foreign network achieving radio coverage at least in part of the geographical area of the home country, the mobile terminal comprising:
 a position monitoring unit adapted to monitor a position of the mobile terminal in terms of geographical coordinates;
 a network selection mode control unit adapted to automatically switch a network selection mode from a home network selection mode to an automatic network selection mode in response to when the mobile terminal crosses the border from the home country to the foreign country and switching back to the home network selection mode in response to when the mobile terminal crosses the border from the foreign country to the home country; and
 a border memory unit adapted to store a list of border coordinates for identifying the border of the home country for use by the network selection mode control unit for the automatic switching, wherein the network selection mode control unit controls the automatic switching based on comparison of the position of the mobile terminal to the list of border coordinates stored within the mobile terminal to determine when the mobile terminal crosses the border from the home country to the foreign country and vice versa.

* * * * *

UNITED STATES PATENT AND TRADEMARK OFFICE
CERTIFICATE OF CORRECTION

PATENT NO.         : 8,929,892 B2                                       Page 1 of 2
APPLICATION NO.    : 13/996260
DATED              : January 6, 2015
INVENTOR(S)        : Speks It is certified that error appears in the above-identified patent and that said Letters Patent is hereby corrected as shown below:

In the drawings:

In Fig. 5, Sheet 3 of 4, delete "          " and insert --          --, therefor.

In Fig. 5, Sheet 3 of 4, delete "          " and insert --          --, therefor.

In the specification:

In Column 3, Line 63, delete "DRAWING" and insert -- DRAWINGS --, therefor.

In Column 6, Line 45, delete "memory unit 14" and insert -- memory unit 18 --, therefor.

Signed and Sealed this
Twenty-third Day of February, 2016

Michelle K. Lee
*Director of the United States Patent and Trademark Office*

CERTIFICATE OF CORRECTION (continued)
U.S. Pat. No. 8,929,892 B2

In Column 6, Line 52, delete "818," and insert -- S18, --, therefor.

In Column 7, Line 27, delete "form the" and insert -- from the --, therefor.

In Column 7, Line 65, delete "unit 22." and insert -- unit 12. --, therefor.

In the claims:

In Column 9, Line 65, in Claim 1, delete "Method" and insert -- A method --, therefor.

In Column 10, Line 47, in Claim 7, delete "Method" and insert -- A method --, therefor.

In Column 11, Line 4, in Claim 8, delete "Mobile" and insert -- A mobile --, therefor.

In Column 12, Line 4, in Claim 12, delete "terminal to" and insert -- terminal according to --, therefor.

In Column 12, Line 13, in Claim 13, delete "Mobile" and insert -- A mobile --, therefor.